(12) United States Patent
Alarco et al.

(10) Patent No.: US 7,727,909 B2
(45) Date of Patent: Jun. 1, 2010

(54) METHOD FOR PRODUCING FINE-GRAINED PARTICLES

(75) Inventors: Jose Antonio Alarco, Indrooroopilly (AU); Geoffrey Alan Edwards, Coolum Beach (AU); Peter Cade Talbot, Chapel Hill (AU)

(73) Assignee: Very Small Particle Company Limited, Wacol (AU)

( * ) Notice: Subject to any disclaimer, the term of this patent is extended or adjusted under 35 U.S.C. 154(b) by 33 days.

(21) Appl. No.: 11/615,424

(22) Filed: Dec. 22, 2006

(65) Prior Publication Data

US 2007/0160525 A1    Jul. 12, 2007

Related U.S. Application Data

(63) Continuation of application No. PCT/AU2005/000935, filed on Jun. 24, 2005.

(60) Provisional application No. 60/582,905, filed on Jun. 25, 2004.

(30) Foreign Application Priority Data

Jan. 24, 2005    (WO) ............... PCT/AU2005/000081

(51) Int. Cl.
*H01L 21/31* (2006.01)
*C01B 13/00* (2006.01)

(52) U.S. Cl. .................................. 438/785; 423/593.1

(58) Field of Classification Search ................. 438/785; 106/286.2; 423/592.1, 593.1
See application file for complete search history.

(56) References Cited

U.S. PATENT DOCUMENTS

| 4,851,293 | A | 7/1989 | Egerton et al. ............... 428/403 |
| 6,752,979 | B1* | 6/2004 | Talbot et al. ............... 423/592.1 |
| 2002/0025294 | A1 | 2/2002 | Dugger ....................... 423/639 |
| 2002/0132732 | A1 | 9/2002 | Brezny et al. ............... 502/304 |
| 2006/0052241 | A1 | 3/2006 | Airiau et al. ................ 502/304 |

FOREIGN PATENT DOCUMENTS

| EP | 0 573 195 B1 | 9/1995 |
| FR | 2 834 978 | 7/2003 |
| GB | 2 204 030 | 11/1988 |
| WO | WO 88/02921 | 4/1988 |
| WO | WO 00/38282 | 6/2000 |
| WO | WO 01/30701 A1 | 5/2001 |
| WO | WO 03/053851 A2 | 7/2003 |

* cited by examiner

*Primary Examiner*—Lex Malsawma
(74) *Attorney, Agent, or Firm*—Winston & Strawn LLP

(57) ABSTRACT

A method for producing complex metal oxide having nano-sized grains that includes the steps of forming a mixture containing at least one metal cation dissolved in a solution and particulate material containing at least one further metal in the form of metal(s) or metal compound(s) and treating the mixture to form the complex metal oxide having nano-sized grains. The at least one further metal from the particulate material becomes incorporated into the complex metal oxide.

21 Claims, 1 Drawing Sheet

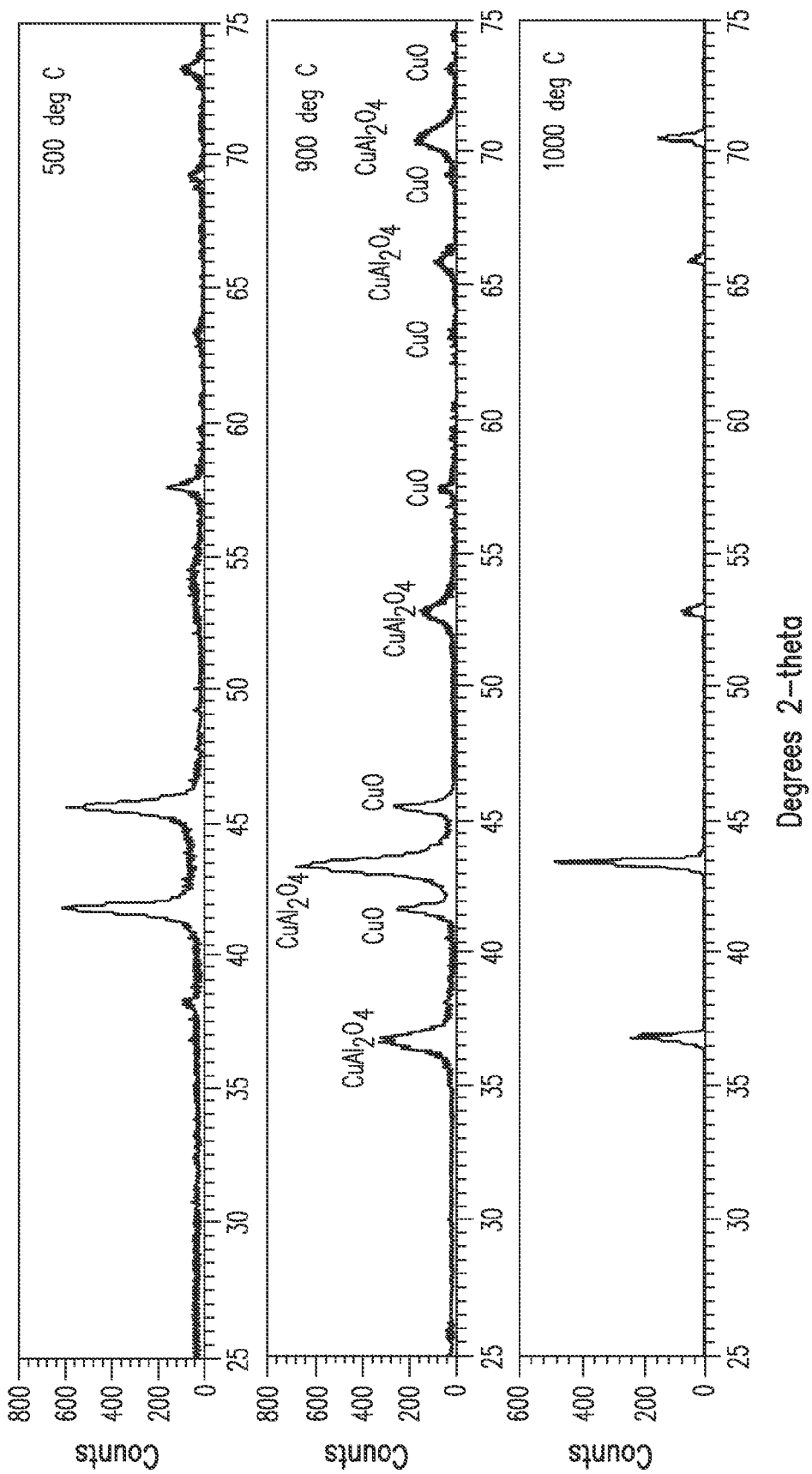

METHOD FOR PRODUCING FINE-GRAINED PARTICLES

CROSS-REFERENCE TO RELATED APPLICATIONS

This application is a continuation of International application no. PCT/AU2005/000935 filed Jun. 24, 2005, which claims the benefit of application Ser. No. 60/582,905 filed Jun. 25, 2004. The entire content of each application is expressly incorporated herein by reference.

FIELD OF THE INVENTION

The present invention relates to very fine-grained particulate material and to methods for producing such very fine-grained particulate material. In preferred aspects, the present invention relates to oxide materials of very fine-grained particulate material and to methods for producing such material. Most suitably, the particulate material has grain sizes in the nanometer scale.

BACKGROUND OF THE INVENTION

Metal oxides are used in a wide range of applications, such as in:
 solid oxide fuel cells (in the cathode, anode, electrolyte and interconnect);
 catalytic materials (automobile exhausts, emission control, chemical synthesis, oil refinery, waste management);
 magnetic materials;
 superconducting ceramics;
 optoelectric materials;
 sensors (eg. gas sensors, fuel control for engines);
 structural ceramics (eg. artificial joints).

Conventional metal oxides typically have grain sizes that fall within the micrometer range and often are supplied in the form of particles having particle sizes greater than the micrometer range. It is believed that metal oxides that are comprised of nanometer sized grains will have important advantages over conventional metal oxides. These advantages include lower sintering temperatures, potentially very high surface areas, and sometimes improved or unusual physical properties. However, the ability to economically produce useful metal oxide materials with nanometer-sized grains has proven to be a major challenge to materials science. It has proven to be difficult to make such fine-scale metal oxides, particularly multi-component (complex) metal oxides, with:
 a) the correct chemical composition;
 b) a uniform distribution of different atomic species;
 c) the correct crystal structure; and
 d) a low cost.

Many important metal oxides have not yet been produced with very fine grains, especially multi-component metal oxides. This is because as the number of different elements in an oxide increases, it becomes more difficult to uniformly disperse the different elements at the ultra-fine scales required for nanometer-sized grains. A literature search conducted by the present inventors has shown that very small grain sizes (less than 20 nm) have only been attained for a limited number of metal oxides. The reported processes used to achieve fine grain size are very expensive, have low yields and can be difficult to scale up. Many of the fine-gained materials that have been produced do not display particularly high surface areas, indicating poor packing of grains.

At this stage, it will be realised that particles of material are typically agglomerates of a number of grains. Each grain may be thought of as a region of distinct crystallinity joined to other grains. The grains may have grain boundaries that are adjacent to other grain boundaries. Alternatively, some of the grains may be surrounded by and agglomerated with other grains by regions having a different composition (for example, a metal, alloy or amorphous material) to the grains.

Methods described in the prior art for synthesising nano materials includes gas phase synthesis, ball milling, co-precipitation, sol gel, and micro emulsion methods. The methods are typically applicable to different groups of materials, such as metals, alloys, intermetallics, oxides and nonoxides.

In our international patent application no. PCT/AU01/01510 (WO 02/42201), we describe a method for producing metal oxide particles having nano-sized grains. This method comprises the steps of:
 a) preparing a solution containing one or more metal cations;
 b) mixing the solution from step (a) with one or more surfactants under conditions such that surfactant micelles are formed within the solution to thereby form a micellar liquid; and
 c) heating the micellar liquid from step (b) to form metal oxide, the heating step being undertaken at a temperature and for a period of time to remove the surfactant and thereby form metal oxide particles.

The metal oxide particles formed by this process have a disordered pore structure. The entire contents of our international patent application no. PCT/AU01/01510 (WO 02/42201) are expressly incorporated herein by cross reference.

The process described in our international patent application no. PCT/AU01/01510 provides a method that allows for economic production of metal oxide particles. The method is particularly useful for preparing complex metal oxide particles which contain two or more metals. Throughout this specification, the term "complex metal oxide" will be used to describe a metal oxide having two or more metals therein. The complex metal oxide particles prepared by this method have a very homogenous distribution of the metal species throughout the particles. A uniform crystal structure is also obtained, which provides further indication of the homogeneity of the mixed metal oxide product. Furthermore, the process is easily able to be scaled up.

In the process described in our earlier international patent application no. PCT/AU01/01510, step (a) involved preparing a solution containing cations of all of the metals to be incorporated into the complex metal oxide. It was believed that putting all of the metals into solution in assisted in obtaining a homogenous distribution of the metals in the mixed metal oxides produced by the process.

U.S. Pat. No. 6,139,816 (Liu et al), the entire contents of which are here incorporated by cross reference, describes a process for the production of metal oxide powders, wherein metal oxide precipitates or metal oxide gels are formed by mixing surfactant with aqueous solutions containing metal salts. The surfactant and salt types are chosen so that a precipitate or gel of the metal oxide forms on mixing. The metal oxide precipitates or metal oxide gels are separated from the rest of the mixture and then further heat treated to obtain metal oxide powders.

U.S. Pat. No. 5,698,483 (Ong et al), the entire contents of which are herein incorporated by cross reference, describes a process for producing nano-size powders. Ong et al mixes a solution containing metal cations with hydrophilic polymers to form a hydrophilic polymer gel. The hydrophilic polymer gel is then heated to drive off water and organics, leaving a nanometer-sized metal oxide powder.

U.S. Pat. No. 6,328,947 (Monden et al), the entire contents of which are herein incorporated by cross reference, describes a process for producing fine particles of metal oxide having diameters of about 20 nm or smaller by hydrolyzing metal halides in the presence of an organic solvent. In Monden et al, metal oxides are formed by hydrolysis of metal halides in organic solution. The metal oxide precipitates are then separated from the mother solution (for example, by filtration, centrifugation and so forth), washed and then dried.

U.S. Pat. No. 5,879,715 (Higgins et al) and U.S. Pat. No. 5,770,172 (Linehan et al), the entire contents of which are herein incorporated by cross reference, describe processes for production of nano-particles by using microemulsion methods. In these processes, a microemulsion is formed and metal oxides are precipitated within the microemulsion micelles, thereby limiting the size of the metal oxide particles to approximately the size of the droplets. In Higgins et al, two water-in-oil emulsions are prepared, one with dissolved metal salt in the water droplets and the other with a reactant in the water droplets. The microemulsions are mixed and when the reactant-containing droplets contact the metal solution-containing droplets, precipitation of metal oxide occurs. In Linehan et al, a water-in-oil microemulsion is formed with dissolved metal salt in the water droplets. A reactant is then added to the system, for example, by bubbling a gaseous reactant therethrough to precipitate metal oxide in the water droplets.

U.S. Pat. No. 5,788,950 (Imamura et al), the entire contents of which are herein incorporated by cross reference, describes a process to synthesise complex metal oxide powders using liquid absorbent resin gels. In Imamura et al, a solution conning at least two dissolved metals is contacted with a liquid absorbent resin such that at least two metals are present in the liquid absorbent resin after combining with the solution. The liquid absorbent resin is allowed to swell and gel. The swollen gel is treated by changing at least one of the pH or temperate of the swollen gel to form a precursor material. The precursor material is pyrolyzed and calcined to form the mixed metal oxide powder.

DE 19852547, the entire contents of which are herein incorporated by cross reference, describes a process for producing metal oxide powders by treating aqueous solutions of metal salts with an aqueous base to produce a precipitate (condensate) in the presence of a water soluble stabiliser.

United States patent application number 2005/0008777 (McCleskey et al), the entire contents of which are herein incorporated by cross reference, describes a process for forming metal oxide films. The process involves preparing solutions of one or more metal precursors and soluble polymers having binding properties for the one or more metal precursors. After a coating operation, the resultant coating is heated at high temperatures to yield metal oxide film.

All of the above described United States patents and patent application and DE 19852547 rely upon the formation of solutions containing all of the metal species that become incorporated onto the metal oxide material.

Production of appropriate solutions, in practice, can occasionally prove to be problematical. For some metals, the range of salts available is very limited or even non-existent. Mixing of different salt types, e.g. chlorides and nitrates, can lead to problems with unwanted precipitation of metal elements. Control of the solution chemistry could be very important to ensure that all of the metal compounds supplied as raw materials to the process went into solution and precipitation of other metal compounds from the solution was avoided. In addition, the presence of large amounts of counter-ions (eg $NO_3$) can lead to problems in controlling heat treatment and unwanted precipitation of other elements in the solution.

BRIEF DESCRIPTION OF THE INVENTION

The present inventors have now surprisingly found that it is not necessary to place all of the metal species into solution and that satisfactory complex metal oxide product can be obtained if one or more of the metal species are added to the process in the form of particulate matter.

Accordingly, in a first aspect, the present invention provides a method for producing complex metal oxide having nano-sized grains, the method comprising:
 a) forming a mixture containing at least one metal cation dissolved in a solution and particulate material containing at least one further metal in the form of metal(s) or metal compound(s); and
 b) treating the mixture of step (a) under conditions such that the complex metal oxide having nano-sized grains is formed, wherein the at least one further metal is incorporated into the complex metal oxide.

The present invention is based upon the surprising discovery that one or more of the metals for incorporation into the mixed metal oxide can be present in the form of particulate material instead of having to be dissolved in the solution formed in step (a), whilst still obtaining mixed metal oxide having nano-sized grains with a reasonable distribution of different elements throughout the material.

The at least one further metal is suitably incorporated into the complex metal oxide matrix such that the complex metal oxide matrix exhibits uniform composition on the nanometer scale. More preferably, the complex metal oxide forms as a single, phase-pure metal oxide.

The complex oxide produced by the present invention may be a single phase material or it may contain multiple phases. Where the complex oxide contains multiple phases, each phase is suitably of different composition to the other phases. One or more of the multiple phases may comprise an oxide of a singe metal. Alternatively, one or more of the phases may comprise a complex metal oxide phase. The multiple phases may also comprise one or more phases of an oxide of a single metal and one or more phases of a complex oxide.

The method of the present invention may be operated such that the particulate material does not fully react with the precursor mixture such that the final product comprises a phase from the original particles and a metal oxide phase that has metal atoms from the precursor mixture and the particulate material therein. This mixture of phases may be achieved by two different routes:
 i) have excess particulate material in the mixture of step (a), such that uncombined particulate material remains after all the precursor mix has combined with particulate material; or
 ii) control the extent of oxide formation, for example, by stopping the oxide formation mechanism, such that incomplete reaction takes place.

Suitably, where particulate material remains that has not combined with the metal cations, the remaining particulate material comprises an oxide phase or is converted to an oxide phase containing metal atoms derived solely from the particulate material.

The present inventors believe that it is more difficult to obtain a completely homogenous mixture in step (a) of the present invention then for processes that utilise all liquid phases. As a result, it is more likely that the final product will include some small regions or phases of the original particulate material therein.

The complex metal oxide may be formed as particles or as a film. Where a film is formed, the film may be formed on a substrate.

Where particles are formed, the particles are preferably agglomerates of the grains. In this embodiment, the grains are suitably lightly sintered together.

The method of the first aspect of the present invention may be used with any method capable of producing complex metal oxides having nano-sized grains and which method previously relied upon all of the precursor or feed metal species being in solution. Such processes include co-precipitation sol-gel synthesis, micro emulsion methods, surfactant-based processes, presses that use polymers mixed with solutions (such as described in Ong, U.S. Pat. No. 5,698,483) and polymer-complex methods that use specific polymers to form complexes with the solutions. The process of the first aspect of the present invention may also use any of the processes described in the patents or patent applications described in the "background of the invention" section of this specification and herein incorporated by cross reference.

Step (a) of the process of the present invention involves the preparation of a solution containing one or more metal cations. The metal cations are chosen according to the required composition of the metal oxide particles. The solution of one or more metal cations is preferably a concentrated solution. The inventors presently believe that a high concentration of dissolved metal is preferred for achieving the highest yield of product.

A very large number of metal cations and metal-containing particulates may be used in the present invention. Examples include metals from Groups 1A, 2A, 3A, 4A, 5A and 6A of the Periodic Table, transition metals, lanthanides and actinides, and mixtures thereof. This list should not be considered to be exhaustive. The mixture may contain one or more different metal cations. Some specific examples of metals that are suitable for use in the present invention include cerium, zirconium, aluminum, titanium chromium, manganese, cobalt, nickel, copper, zinc, aluminum magnesium, strontium, yttrium, niobium, molybdenum, platinum group metals (including Pt, Pd, Rh, Re), gold, silver and metals from the lanthanide series. It will be appreciated that the present invention should not be considered to be limited solely to this list of metals.

The metal cation solution is suitably produced by mixing a salt or salts containing the desired metal(s) with a solvent. Any salt soluble in the particular solvent may be used. The metal cation solution may also be produced by mixing a metal oxide or metal oxides or a metal or metals with appropriate solvent(s).

A number of solvents can be used to prepare the metal cation solution. The solvents are preferably aqueous-based solvents. Examples of suitable solvents include water, nitric acid, hydrochloric acid, sulphuric acid, hydrofluoric acid, ammonia, alcohols, and mixture thereof. This list should not be considered exhaustive and the present invention should be considered to encompass the use of all suitable solvents.

The particulate material used in the present invention suitably has a particle size that is similar to or smaller than the grain size of the mixed metal oxide produced by the method. It is preferred that the particulate material present in the mixture has a particle size that falls within the range of about 1 nm to about 250 nm, more preferably 1-100 nm even more preferably 1-50 nm, further preferably 1-25 nm, further preferably 1-10 nm, most preferably 1-4 nm. It is considered that the larger the particle size, the more difficult it is to obtain chemical homogeneity with the other elements in the metal oxide.

The particulate material provides one or more further metals for incorporation into the metal oxide. The one or more metals may be present in the form of a metal or mixture of metals or metal alloys. In this embodiment, the particulate material comprises particles of a metal, particles of two or more metals, particles of metal alloy containing two or more metals, or mixtures thereof. In practice, fine particulates of metal are often quite reactive and this may introduce difficulties in handling the metal particles, as well as raising safety issues.

Preferably, the particulate material containing one or more further metals comprises particles of metal compounds, or a mixture of particles of different metal compounds, or particles containing mixed metal compounds, or mixtures thereof. The particles may be in the form of oxides, nitrates, chlorides, sulfates, hydroxides, more complex oxy-hydrides such as those that may be produced using sol-gel type methods, etc. It is preferred that the particulate material contains one or more metal oxides, hydroxides or oxy-hydrides.

It is preferred that the particulate material is evenly dispersed throughout the mixture that is treated in step (b) of the press of the first aspect of the present invention. In this regard, the solution produced in step (a) may be suitably treated to disperse the particulate material throughout the solution. Many techniques for dispersion of particles in liquids are known. Dispersion may be achieved by control of solution characteristics (e.g. pH, temperature, addition of specific dispersants) together with appropriate mix techniques. Mixing may be achieved by using any suitable known mixing apparatus, including high speed impellers, flow mixers, roll mills and ultrasonic mixers. The particulate material may be dispersed after the solution has been formed. Alternatively, the particulate material may be mixed with the soluble metal compound(s) prior to addition of the solute to form the solution. As a further alternative, the particles may be dispersed in water and the metal salt(s) or metal cation solution subsequently added to the dispersion of particles.

Other materials may be added to the mixture formed in step (a), depending upon the particular process chosen to form the metal oxide. The other materials added to the mixture may include surfactants, emulsifying agents, swellable polymers, hydrophilic polymers, immiscible liquids (where microemulsion techniques are used), precipitation agents, hydrolysing agents and the like. Such additive materials may be added for specific purposes, for example to aid the formation of homogenous precursor solids here two or more elements are present in solution, and/or to increase porosity, and/or to aid formation of nano-sized grains.

The mixture of step (a) may be treated in a number of different ways to form the metal oxide. Some treatments include:

i. heat treatment, typically by heating to an elevated temperature;
ii. precipitation, preferably followed by heat treatment;
iii. hydrolysis, preferably followed by heat treatment;
iv. gelling, preferably followed by heat treatment,
v. calcination;
vi. pyrolysis.

Again, the choice of treatment used will depend upon the particular process chosen.

In some embodiments, step (b) of the present invention involves treating the mixture such that the dissolved metal cations initially form a solid precursor phase intermixed with the particulate material. The solid precursor phase and the particulate material then combine to form the complex meal oxide phase or phases. In such embodiments, step (b) may include a heat treatment step that facilitates the combining of the solid precursor phase with the particulate material to form the complex oxide phase(s). In some embodiments, the heat treatment also assists in forming the solid precursor phase from the mixture of step (a).

In instances where step (b) includes a heating step, the heat step encompasses any heat treatment that results in the formation of the metal oxide(s). The heating step may involve heating to an elevated temperature for example, from 200° C. to 1300° C., preferably from 300° C. to 1200° C. The actual temperatures and duration of heating is somewhat dependent upon the particular oxides being produced. The skilled person would readily be able to ascertain the required temperature and heating times required to form any particular metal oxide.

The method of the present invention is particularly suitable for use with the process described in our International patent application no. PCT/AU01/01510 and U.S. Pat. No. 6,752,979, the entire contents of which are herein incorporated by cross reference.

Accordingly, in a second aspect the present invention provides a method for producing complex metal oxide particles having nano-sized grain, the method comprising:

a) preparing a solution containing one or more metal cations;

b) mixing the solution from step (a) with surfactant under conditions such that surfactant micelles are formed within the solution to thereby form a micellar liquid; and c) heating the micellar liquid from step (b) to form metal oxide, the heating step being undertaken at a temperate and for a period of time to remove the surfactant and thereby form metal oxide particles;

characterised in that the micellar liquid heated in step (c) also contains particulate material containing one or more further metals in the form of metal(s) or metal compound(s) and the one or more further metals are incorporated into the metal oxide particles having nano-sized grains produced in step (c).

The method of the second aspect of the present invention may optionally further comprise the steps of treating the mixture from step (b) to form a gel and heating the gel to form the particles of metal oxide.

Step (b) of the method of the second aspect of the present invention involves adding surfactant to the mixture to create a surfactant/liquid mixture. Preferably, the surfactant is added to the solution under conditions in which micelles are formed, such that a micellar liquid is formed.

A micellar liquid is formed when surfactant is added in sufficient quantity such that the surfactant molecules aggregate to form micelles. In a micellar liquid, micelles do not exhibit a significant degree of order, therefore the viscosity of the liquid is usually much less than that of more ordered liquid crystal phases, which are commonly gel-like. Use of micellar liquids as opposed to liquid crystals therefore enables simple, rapid and thorough mixing of the solution and surfactant, which is important for commercial production processes. In some embodiments, the amount of surfactant mixed with the solution is sufficient to produce a micellar liquid in which the micelles are closely spaced. The conditions under which the micellar liquid is foamed will depend upon the particular surfactant(s) being used. In practice, the main variables that need to be controlled are the amount of surfactant added and the temperature. For some surfactants, the temperature should be elevated, whilst for others room temperature or below is necessary.

Any surfactant capable of forming micelles may be used in the present invention. A large number of surfactants may be used in the invention, including non-ionic surfactants, cationic surfactants, anionic surfactants and zwitteronic surfactants. Some examples include Brij $C_{16}H_{33}(OCH_2CH_2)_2OH$, designated $C_{16}EO_2$, (Aldrich); Brij 30, $C_{12}EO_4$, (Aldrich); Brij 56, $C_{16}EO_{10}$, (Aldrich); Brij 58, $C_{16}EO_{20}$, (Aldrich); Brij 76, $C_{18}EO_{10}$, (Aldrich); Brij 78, $C_{16}EO_{20}$, (Aldrich); Brij 97, $C_{18}H_{35}EO_{10}$, (Aldrich); Brij 35, $C_{12}EO23$, (Aldrich); Triton X-100, $CH_3C(CH_3)_2CH_2C(CH_3)_2C_6H_4(OCH_2CH_2)_xOH$, x=10(av), (Aldrich); Triton X-114, $CH_3C(CH_3)_2CH_2C(CH_3)_2C_6H_4(OCH)_2CH_2)_5OH$ (Aldrich); Tween 20, poly (ethylene oxide) (20) sorbitan monokayrate (Aldrich); Tween 40, poly(ethylene oxide) (20) sorbitan monopalmitate (Aldrich); Tween 60, poly(ethylene oxide) (20) sorbitan monostearate (Aldrich); Tween, poly(ethylene oxide) (20) soribitan monooleate (Aldrich); and Span 40, sorbitan monopalmitate (Aldrich), Terital TMN 6, $CH_3CH(CH_3)CH(CH_3)CH_2CH_2CH(CH_3)(OCH_2CH_2)_6OH$ (Fulka); Tergital TMN 10, $CH_3CH(CH_3)CH(CH_3)CH_2CH_2CH(CH_3(OCH_2CH_2)_{10}OH$ (Fulka); block copolymers having a poly(ethylene oxide)-poly(propylene oxide)-poly(ethylene oxide) (EO—PO—EO) sequence centered on a (hydrophobic) poly(propylene glycol) nucleus terminated by two primary hydroxyl groups; Pluronic L121 $(_{Mav}=4400)$, $EO_5PO_{70}EO_5$ (BASF); Pluronic $L_{64}$ $(_{Mav}=2900)$, $EP_{13}PO_{30}EO_{13}$(BASF); Pluronic $P_{65}$ $(_{Mav}=3400)$, $EP_{20}PO_{30}EO_{20}$ (BASF); Pluronic P85 $(_{Mav}=4600)$, $EO_{26}PO_{39}EO_{26}$ (BASF); Pluronic P103 $(_{Mav}=4950)$, $EO_{17}PO_{56}EO_{17}$ (BASF); Pluronic P123$(_{Mav}=5800)$, $EO_{20}PO_{70}EO_{20}$ (Aldrich); Pluronic F68 $(_{Mav}=8400)$, $EO_{80}PO_{30}EO_{80}$ (BASF); Pluronic F127 $(_{Mav}=12600)$, $EO_{106}PO_{70}EO_{106}$ (BASF); Pluronic F88 $(_{Mav}=11400)$, $EO_{100}PO_{39}EO_{100}$ (BASF); Pluronic 25R4 $(_{Mav}=3600)$, $PO_{19}EO_{33}PO_{19}$ (BASF); star diblock copolymers having four $EO_n$—$PO_m$ chains (or in reverse, the four $PO_n$—$EO_m$ chains) attached to an ethlenediamine nucleus, and terminated by secondary hydroxyl groups; Tetronic 908 $(_{Mav}=25000)$, $(EO_{113}PO_{22})_2NCH_2CH_2N(PO_{113}EO_{22})_2$ (BASF); Tectonic 901 $(_{Mav}=4700)$, $(EO_3PO_{18})_2NCH_2CH_2(PO_{18}EO_3)_2$ (BASF) and Tetronic 90R4 $(_{Mav}=7240)$, $(PO_{19}EO_{16})_2NCH_2CH_2N(EO_{16}PO_{19})_2$ (BASF)

The above surfactants are non-ionic surfactants. Other surfactants that can be used include:

Anionic surfactant:
Sodium dodecyl sulfate $CH_3(CH_2)_{11}OSO_3NA$
There appears to be several manufacturers. Sigma is an example.

Cationic surfactants:
Cetyltrimethylammonium chloride $CH_3(CH_2)_{15}N(CH_3)_3$ Cl Aldrich
Cetyltrimethylammonium bromide $CH_3(CH_2)_{15}N(CH_3)_3$ BT Aldrich
Cetylpyridinium chloride $C_{21}H_{38}NCl$ Sigma.

This list should not be considered to be exhaustive.

The micellar liquid provided to step (c) of the second aspect of the present invention also contains particulate material containing one or more further metals in the form of metals or metal compounds or both. The particulate material used in the second aspect of the present invention suitably has a particle size that is similar to or smaller than the grain size of the mixed metal oxide produced by the method. It is preferred that the particulate material present in the micellar liquid has a particle size that falls within the range of about 1 nm to about 250 nm, more preferably 1-100 nm, even more preferably 1-50 nm, further preferably 1-25 nm, further preferably 1-10 mm, most preferably 1-4 nm. It is considered that the larger the particle size, the more difficult it is to obtain chemical homogeneity with the other elements in the compound.

The particulate material may be added at any stage of the process of the second aspect prior to the heat step which forms the mixed metal oxide material. For example, the particulate material may be mixed with the metal compounds that are dissolved in step (a). Alternatively, the particulate material may be added to the solvent that is used in step (a) to form the solution containing one or more metal cations. As a further alternative, the particulate material may be added to the solution formed in step (a). In yet a further alternative, the particulate material may be added to the one or more surfactants mixed with the solution in step (b). In a still further alternative, the particulate material may be added to the micellar liquid produced in step (b).

It is preferred that the particulate material is evenly dispersed throughout the micellar liquid that is treated in step (c) of the process of the second aspect of the present invention. In this regard, where the particulate material is added prior to formation of the micellar liquid, the solution produced in step (a) is suitably treated to disperse the particulate material throughout the solution. Many techniques for dispersion of particles in liquids are known. Dispersion may be achieved by control of solution characteristics (e.g. pH, temperature, addition of specific dispersants) together with appropriate techniques. Mixing may be achieved by using any suitable known mixing apparatus, including high speed impellers, flow mixers, roll mills and ultrasonic mixers.

Similarly, if the particulate material is added to the micellar liquid formed in step (b) the particulate material is preferably mixed with and dispersed within the micellar liquid. Again, any suitable mixing apparatus may be used.

The particulate material that is contained in the micellar liquid treated in step (c) provides one or more metals for incorporation into the mixed metal oxide particles. The one or more metals may be present in the form of a metal or mixture of metals or metal alloys. In this embodiment, the particulate material comprises particles of a metal particles of two or more metals, particles of metal alloy two or more metals, or mires thereof In practice, fine particulates of metal are often quite reactive and this may introduce difficulties in handling the metal particles, as well as raising safety issues.

Preferably, the particulate material containing one or more ether metals comprises particles of metal compounds, or a mixture of particles of different metal compounds, or particles containing mixed metal compounds, or mixtures thereof. The particles may be in the form of oxides, nitrates, chlorides, sulfates, hydroxides, more complex oxy-hydrides such as those that may be produced using sol-gel type methods, etc. It is preferred that the particulate material contains one or more metal oxides, hydroxides or oxy-hydrides.

Step (c) of the method of the second aspect of the present invention typically involves heating of the mixture from step (b) to an elevated temperature to thereby form the metal oxide particles. This step may optionally be preceded by a step of treating the surfactant/liquid mixture to form a gel. Commonly, the gel forms due to ordering of the micelles to form a liquid crystal. Typically, it is sufficient to change the temperature of the mixture to firm the gel. For some mixtures, cooling will result in gel formation. For other mixtures, heating will result in gel formation. This appears to be dependent upon the surfactant(s) used.

If the optional step of forming a gel is used in the method, the heating of step (c) involves heating the gel.

The heating step results in the formation of the metal oxide and the pore structure of the particles. The heating step encompasses any heat treatment that results in the formation of the metal oxide(s). The heating step may involve heating to an elevated temperature, for example, from 200° C. to 1300° C. The actual temperatures and duration of heating is somewhat dependent upon the particular oxides being produced. The skilled person would readily be able to ascertain the required temperature and heating times required to form any particular metal oxide.

The present inventors believe that the process of the present invention may involve localised exothemic reactions occurring, which could lead to highly localised temperatures.

The heating step may involve a rapid heating to the maximum desired temperature, or it may involve a much more closely controlled heat treatment regime. For example, the heating step may be carried out under a controlled atmosphere. The heating step may involve heating to a drying temperature (generally below the boiling temperature of the mixture) to dry the mixture, followed by a slow ramp up to the maximum applied temperature, or followed by a series of incremental increases to intermediate temperatures before ultimately reaching the maximum applied temperature. The duration of the heating step may vary widely, with a preferred time in step (c) being from 15 minutes to 24 hours. It will be appreciated that step (c) is intended to encompass all heating profiles that result in the formation of particles of metal oxide.

The heating step (c) of the present invention encompasses all such heating steps that result in the formation of the desired metal oxide particles. The heating step may be carried out using heating apparatus known by the person of skill in the art to be suitable for such purposes. Examples include hot plates or other heated substrates, ovens, stationary table furnaces, rotary table furnaces, induction furnaces, fluid bed furnaces, bath furnaces, flash furnaces, tube furnace, infrared furnaces, muffle furnaces, drop furnaces, belt furnaces, rotary furnaces, rotary kilns, rotary dryers, spray dryers, spin-flash dryers, drum dryers, reaction vessels, and flash calciners.

The present inventors have shown that the heating step of the second aspect of the present invention breaks down any order that existed in the surfactant/liquid mixture, and the results of the method of the present invention are particles of metal oxide having nano-sized grains with significant amounts of crystallinity, disordered pore structures, broad distributions of pore sizes and an essentially homogenous composition throughout. The present invention can be distinguished from the prior art surfactant templating processes which are reliant upon the micellar or liquid crystal structure being maintained throughout a reaction step (which may or may not involve heating) to result in the formation of metal oxide materials having very narrow pore distributions and ordered pore structures. Such prior art processes are dependent upon the propagation of slow, controlled hydrolysis-condensation reactions to obtain the desired pore structure. Although the present inventors are uncertain of the exact reaction taking place in the method of the present invention, it is believed that those reactions are not solely hydrolysis-condensation reactions. The wide range of elements that have been successfully used in the present invention, the absence of a highly-controlled liquid phase reaction step, the high degree of crystallinity obtained in the metal aside particles, and the short processing times indicate that controlled hydrolysis-condensation reactions are not essential in the method of the second aspect of the present invention, and indeed it is possible that they do not occur at all.

The metal oxide particles produced by preferred embodiments of the method have nano-sized grains. Preferably, the grain size falls within the range of 1-250 nm, more preferably 1-100 nm, even more preferably 1-50 nm, still even more preferably 1-20 nm, further even more preferably 2-10 nm, most preferably 2-8 nm.

The grain size was determined by examining a sample of the particles using TEM (transmission electron microscopy), visually evaluating the grain size and calculating an average grain size therefrom. The particles may have varying particle size due to the very fine grains aggregating or cohering together. The particle size may vary from the nanometer range up to the micrometer range or even larger. The particles may have large specific surface areas (for the particular metal oxide, when compared with prior art processes for making those particles) and exhibit a broad distribution of pore sizes.

In all aspects of the process of the present invention, it may be desirable to add a pore-forming material to the mixture to form a porous complex metal oxide having a desired pore structure. In this embodiment, the pore-forming material is added to the mixture prior to forming the complex metal oxide and removed from the complex metal oxide either during the step of forming the metal oxide or after formation of the metal oxide to leave a porous complex metal-oxide. The pore-forming material may be polymer-based pore formers, polymer-based particles such as latex, salts or other particles such as carbon black The pore forming material may be selected to provide pore sizes in the range of approximately 7 nm to 250 nm. The pore forming material is suitably selected to produce a porous complex metal oxide exhibiting enhanced high temperature stability.

The grain size of the porous complex metal oxide may fall within the range of 1-150 nm.

The use of a pore forming material to produce complex metal oxides of enhanced high temperature stability is described in our co-pending U.S. provisional patent application No. (60/538 867), the entire contents of which are herein incorporated by cross reference.

In all aspects of the present invention, the metal oxide may include one or more further metals, such as platinum group metals. The one or more further metals may be present in the form of regions of metallic material on or within the oxide.

The method of the present invention may be used to make metal oxide particles. The metal oxide particles may have a grain size substantially in the range from 1-250 nm, Preferably, the grain size falls within the range of 1-100 nm, more preferably 1-50 nm, more preferably 1-20 nm, even more preferably 2-10 nm, most preferably 2-8 nm.

The particles are preferably substantially crystalline and contain only small or negligible amount of amorphous material. The particles are suitably phase pure and have essentially uniform composition. The particles may have a single metal oxide lattice containing two or more metals. The particles may have two or more metal oxide phases. One or more of those oxide phases may be complex oxide phases. Generally, the grains within the particles are approximately equiaxed.

The method of the present invention surprisingly has been found to be able to form complex metal oxides having enhanced thermal stability when compared with previous methods that utilised solutions of precursors only. By enhanced thermal stability, it is meant that the loss of specific surface area as a result of exposure to high temperature is reduced.

The particles preferably have other properties as described with reference to the particles described with reference to the first aspect of the invention.

BRIEF DESCRIPTION OF THE DRAWINGS

FIG. 1 shows XRD traces for products described in Example 7.

EXAMPLES

Example 1

A complex metal oxide of formula $La_{0.5}Sr_{0.25}Pd_{0.018}Ni_{0.04}Ti_{0.942}O_x$ was produced as follows. This is an example of an essentially single-phase compound.

To make Ti-based nanoparticles, a method similar to known methods was used 45.24 g of titanium isopropoxide was mixed with acetic acid in a 4:1 isopropoxide:acetic acid molar ratio. This mixture was then added to approx. 150 mls of water and a white mass of agglomerated nanoparticles formed which was separated from the water by centrifuge. The nanoparticles produced by this method are thought to be approximately equiaxed particles around 3 nm diameter and consist of Ti, O and H.

A solution containing the other required elements was formed by mixing 40 mls of water, 10 g nitric acid, 34.84 g lanthanum nitrate hexahydrate, 8.51 g strontium nitrate, 0.76 g nickel carbonate, and 3.08 g of palladium nitrate solution (10%).

The titanium-based nanoparticles were added to the solution and stirred at about 50° C. The particles dispersed in the solution. 16.15 g of Monarch 1300 carbon black was added to the solution and mixed in with a high-speed stirrer. Then 64 g of Erunon LA4 surfactant was added and again mixed in with the high-speed stirrer.

The final mix was heat treated slowly to 650° C. and then treated for 2 h at 800° C., XRD traces showed mostly the required perovskite phase with minor amounts of impurity phases. TEM showed approximately equiaxed grains, with grain sizes ranging between 15 nm and 100 nm, with an average grain size of about 40 nm;

Example 2

A compound of nominal formula $La_{0.8}Sr_{0.2}Pd_{0.024}Ni_{0.04}Ti_{0.936}O_x$ plus 10% $CeO_2$ was produced using similar methods to example 1, except the secondary heat treatment was carried out at 1000° C. This is an example of a complex compound with multiple different phases. XRD analysis showed the $La_{0.5}Sr_{0.25}TiO_3$ phase as the main phase and the presence of several other phases. TEM showed the average grain size of this material to be about 40 nm.

Example 3

A compound of nominal formula $La_{0.8}Sr_{0.2}Pd0.03Ni_{0.04}Cu_{0.03}Ti_{0.9}O_x$ plus 10% $CeO_2$ was produced using similar methods to example 2. XRD analysis again showed the $La_{0.5}Sr_{0.25}TiO_3$ phase as the main phase and the presence of several other phases. TEM showed the average grain size of this material to be about 40 nm Example 4

A complex metal oxide of formula $La_{0.5}Sr_{0.25}Pd_{0.018}Ni_{0.04}Ti_{0.942}O_x$ was produced in the same manner as in example 1, except that Erunon LA2 surfactant was used instead of Erunon LA4. XRD traces showed mostly the required perovskite phase with minor amounts of impurity phases. TEM showed an average grain size of about 30 nm.

Example 5

A complex metal oxide of formula $La_{0.5}Sr_{0.25}Pd_{0.018}Ni_{0.04}Ti_{0.942}O_x$ was produced in the sane manner as in example 1, except that polyethylene glycol (molecular weight~was used instead of Erunon LA4. XRD traces showed mostly the required perovskite phase with minor amounts of impurity phases. TEM showed an average grain size of about 40 nm.

Example 6

A complex metal oxide of formula $MgAl_2O_4$ was produced by the following procedure. 29.07 g of aluminium hydroxide nanoparticles, Dispal 23N4-80 (Sasol Corporation) was dispersed in 260 ml of water. 55.19 g of magnesium nitrate hexahydrate was dissolved in 100 ml water. This solution was added to the dispersion, then 16 g of Raven 850 carbon black (Columbian Chemicals) was added. This mixture was stirred with a high speed stirrer, then 64 g of Erunon LA4 surfactant was added followed by further stiring. This mix was heated slowly to 500° C. XRD showed the material was $MgAl_2O_4$ spinel phase, and TEM showed the average grain size was about 20 nm.

Example 7

A complex metal oxide of formula $CuAl_2O_4$ was produced in a similar manner to example 6, except that the heat treatment continued from 500° C. and samples were taken at 500° C., 900° C. and 1000° C.

FIG. 1 shows XRD traces from samples taken at these three temperatures. It can be seen at 500° C. that the phases are CuO and alumina (alumina peaks are not clearly visible in this figure). As the heat treatment proceeds, $CuAl_2O_4$ forms and increases while the CuO and alumina diminish. Clearly it is possible to stop this reaction at any stage of the heat treatment to attain a desired mixture of CuO, $CuAl_2O_4$ and alumina.

TEM showed approximately equiaxed grains, with average grain sizes after heat treatment at 900° C. and 1000° C. to be ~40 nm and ~250 nm, respectively.

Comparative Example 1

$CuAl_2O_4$ was produced in a similar manner to example 7, except that the aluminium was provided via dissolved aluminium nitrate nonahydrate, and no particulate matter was used. Table 1 compares surface areas obtained after heat treating to 850° C., 900° C. and 1000° C. After these heat treatments, the XRD traces were very similar for this material and the material in example 7, i.e. the degree of formation of $CuAl_2O_4$ was very similar. Clearly the material of example 7 has considerably higher surface area at the higher temperatures.

TABLE 1

|  | 850° C. | 900° C. | 1000° C. |
| --- | --- | --- | --- |
| Example 7 | 58 m²/g | 52 m²/g | 6.3 m²/g |
| Comparative Example 1 | 23 m²/g | 15 m²/g | 1.6 m²/g |

Preferred embodiments of the present invention provide the following advantages over the prior art known to the present inventors:

(a) the metal oxides produced have extremely small grain sizes. For example, cerium dioxide materials have grain sizes ranging between about 2 and about 10 nanometers;

(b)) the metal oxides produced are highly crystalline, ie. they have a high degree of atomic order. This is an important advantage over most surfactant-templated materials, which have almost no atomic crystallinity, (c) extremely high surface areas may be obtained for some metal oxides (compared to prior art processes). The surface areas of the resultant powders are dependent upon the type of surfactant used, the type of metal ions, and the heat treatment. It also appears that the type of salt (eg. nitrate, acetate, chloride, etc.) may influence the surface area, (d) very complex, multi-component metal oxides can be produced using the present invention;

(e) multi-phase metal oxides can be produced;

(f) metal oxides having enhanced thermal stability can be produced;

(g) the process uses low cost raw materials and simple processing technology. It is therefore extremely inexpensive;

(h) in cases where heating of a gel is conducted, the gels consist of ordered surfactant structures. However, this ordered structure is definitely not present in the final materials. In addition, pore size distributions are very broad, indicating that the pores do not result from simple burn-out of surfactant micelles. The pore structure is therefore significantly different to that in the surfactant-templated materials described previously.

(i) in cases where the precursor materials containing one or more further metals are refractory, difficult to dissolve, or only dissolve in solutions that are incompatible with other solvents or compounds in solution (for example, by causing undesired precipitation or coprecipitation of metal compounds), particulate material containing one or more further metals may be used as one of the precursor or food materials to the process without requiring dissolution. This simplifies processing whilst surprisingly allowing mixed metal oxide particles having appropriate properties to be obtained.

Those stilled in the art will appreciate tat the present invention may be susceptible to variations and modifications other than those specifically described. It is to be understood that the present invention encompasses all such variations and modifications that fall within its spirit and scope.

What is claimed is:

1. A method for producing complex metal oxide particles having nano-sized grains, the complex metal oxide comprising a metal oxide phase containing two or more metallic elements homogeneously distributed in the oxide phase, and the method comprising:
   a) preparing:
      (i) a solution containing one or more metal cations;
      (ii) a surfactant present such that surfactant micelles are formed within the solution to thereby form a micellar liquid; and
      (iii) solid, particulate material containing one or more further metals in the form of metal(s) or metal compound (s); and
   (b) heating the mixture to form the complex metal oxide comprising a metal oxide phase containing two or more metallic elements homogeneously distributed in the oxide phase, with the heating being undertaken at a temperature and for a period of time to remove the surfactant and thereby form complex metal oxide particles;
   wherein the one or more further metal(s) are incorporated into the complex metal oxide having nano-sized grains.

2. A method as claimed in claim 1 further comprising the steps of treating the mixture to form a gel and heating the gel to form the particles of complex metal oxide.

3. A method as claimed in claim 1 wherein the surfactant is selected from non-ionic surfactants, cationic surfactants, anionic surfactants and zwitteronic surfactants.

4. A method as claimed in claim 1 wherein the particulate material has a particle size that is similar to or smaller than the grain size of the complex metal oxide that is produced.

5. A method as claimed in claim 1 wherein the particulate material is evenly dispersed throughout the mixture.

6. A method as claimed in claim 1 wherein the particles are dispersed in water or solution and one or more soluble metal salts or a solution containing metal cations are subsequently added thereto to form a solution of metal cations containing dispersed particles.

7. A method as claimed in claim 1 wherein the particles are dispersed in the solution containing the metal cation(s) from step (a) prior to forming the micellar liquid.

8. A method as claimed in claim 1 wherein the particulate material that is contained in the mixture comprises particles of a metal or mixture of metals or metal alloys, or particles of metal compounds, or a mixture of particles of different metal compounds, or particles containing mixed metal compounds, or mixtures thereof.

9. A method as claimed in claim 8 wherein the particles are in the form of oxides, nitrates, chlorides, sulfates, hydroxides, more complex oxy-hydrides or mixtures thereof.

10. A method as claimed in claim 1 wherein the heating of the mixture is to an elevated temperature sufficient to thereby form the complex metal oxide particles.

11. A method as claimed in claim 10 wherein the heating is preceded by treating the surfactant/liquid mixture to form a gel and the heating involves heating the gel.

12. A method as claimed claim 1 further comprising adding a pore-forming material to the mixture prior to forming the complex metal oxide, said pore forming material being removed either during the step of forming the complex metal oxide or after formation of the metal oxide to leave a porous complex metal-oxide.

13. A method as claimed in claim 12 wherein the pore-forming material is a polymer- based pore former, polymer-based particles such as latex, salts or other particles such as carbon black.

14. A method as claimed in claim 13 wherein the pore forming material is selected to provide pore sizes in the range of approximately 7 nm to 250 nm.

15. A method as claimed in claim 1 wherein the complex metal oxide comprises a single phase material or multiple phases.

16. A method as claimed in claim 15 wherein one or more of the multiple phases comprises an oxide of a single metal and one or more phases of a complex metal oxide.

17. A method as claimed in claim 15 wherein incomplete combining of the particulate material and the metal cation(s) occurs such that one of the oxide phases comprises an oxide phase containing metal derived solely from the particulate material.

18. A method as claimed in claim 17 wherein the particulate material is added in excess of the amount required to form the complex metal oxide.

19. A method as claimed in claim 17 wherein formation of the oxide phase is ended before all of the particulate material has combined with the metal cations to form the oxide phases(s).

20. A method as claimed in claim 17 wherein the complex metal oxide includes one or more further metals present in the form of regions of metallic material on or within the oxide.

21. A method as claimed in claim 20 wherein the one or more further metals are one or more platinum group metals or are selected from one or more of gold, silver, copper, cobalt or nickel.

* * * * *

UNITED STATES PATENT AND TRADEMARK OFFICE
CERTIFICATE OF CORRECTION

PATENT NO. : 7,727,909 B2  
APPLICATION NO. : 11/615424  
DATED : June 1, 2010  
INVENTOR(S) : Alarco et al.

Page 1 of 1

It is certified that error appears in the above-identified patent and that said Letters Patent is hereby corrected as shown below:

Column 14:
Line 51 (claim 1, line 12), change "compound" to -- compound(s) --.
Line 52 (claim 1, line 13), delete "(s)".
Line 53 (claim 1, line 14), change "(b)" to -- b) --.

Signed and Sealed this

Thirteenth Day of July, 2010

David J. Kappos
*Director of the United States Patent and Trademark Office*